(12) United States Patent
Shichinohe et al.

(10) Patent No.: US 6,484,607 B2
(45) Date of Patent: Nov. 26, 2002

(54) ALL-TERRAIN SADDLE TYPE VEHICLE

(75) Inventors: Takashi Shichinohe, Saitama (JP); Yoshiaki Hori, Saitama (JP); Noriaki Takano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 33 days.

(21) Appl. No.: 09/742,081

(22) Filed: Dec. 22, 2000

(65) Prior Publication Data

US 2001/0020402 A1 Sep. 13, 2001

(30) Foreign Application Priority Data

Dec. 22, 1999 (JP) ............................................. 11-364012

(51) Int. Cl.[7] ............................................. F16H 47/00
(52) U.S. Cl. ..................... 74/730.1; 74/732.1; 192/3.31
(58) Field of Search ............................... 74/730.1, 732.1; 477/5, 6; 192/3.31

(56) References Cited

U.S. PATENT DOCUMENTS

| 4,743,776 | A | * | 5/1988 | Baehler et al. ................ 290/31 |
| 5,992,355 | A | * | 11/1999 | Shichinohe et al. ..... 123/41.56 |
| 6,183,389 | B1 | * | 2/2001 | Tabata ............................ 477/5 |
| 6,325,190 | B1 | * | 12/2001 | Yoshimoto et al. ........ 192/3.21 |

FOREIGN PATENT DOCUMENTS

| JP | 57-69163 | 4/1982 |
| JP | 7-195949 | 8/1995 |

* cited by examiner

Primary Examiner—Sherry Estremsky
Assistant Examiner—Tisha D. Lewis
(74) Attorney, Agent, or Firm—Birch, Stewart Kolasch & Birch, LLP

(57) ABSTRACT

A gear transmission for keeping a load in balance at both ends of a crank shaft in an all-terrain saddle type vehicle provided with a transmitting unit capable of transmitting power from the crank shaft to the gear transmission and a generator connected to the crank shaft. A torque converter is provided with a lock-up clutch mounted on the crank case side of the torque converter and capable of directly connecting a pump to a turbine. A driving gear fixed to the turbine and capable of transmitting the output of the torque converter to the gear transmission is mounted on one end side of a crank shaft outside the crank case such that the lock-up clutch is sandwiched between the torque converter and the driving gear. A generator is mounted on the other end side of the crank shaft outside the crank case.

18 Claims, 10 Drawing Sheets

ALL-TERRAIN SADDLE TYPE VEHICLE

BACKGROUND OF THE INVENTION

1. Field of the Invention

The present invention relates to an all-terrain saddle type vehicle provided with a gear transmission capable of selectively establishing a plurality of speed change steps, a transmitting unit capable of transmitting power from a crank shaft rotatably supported by the crank case of an engine, and a generator connected to the crank shaft.

2. Description of Background Art

An all-terrain saddle type vehicle is disclosed in Japanese Patent Laid-Open No. H7-195949, in which a centrifugal automatic clutch is used as a transmitting unit for transmitting the power of a crankshaft to a gear transmission side. A power transmitting unit using a belt converter mechanism using a V belt is utilized. However, in such a centrifugal automatic clutch or such a belt converter mechanism, a torque amplification operation can not be expected and the number of the speed change steps of a gear transmission considerably increases to complicate the constitution of the gear transmission. In particular, in the power transmitting unit using the belt converter mechanism, a belt needs to be changed at regular time intervals and when water or dirt is attached to the belt, the belt slips to reduce the durability of the belt, which complicates a cooling air system for cooling the V belt because the system that is introduces the cooling air needs to be made waterproof.

In order to considerably reduce the number of the speed change steps of a gear transmission and to simplify the constitution of the gear transmission and to realize a maintenance-free gear transmission, a torque converter may be used instead of the above centrifugal automatic clutch or the belt converter mechanism and a power transmitting unit using such a torque converter is disclosed, for example, in Japanese Patent Laid-Open No. S57-69163. However, the power transmitting unit disclosed in Japanese Patent Laid-Open No. S57-69163 has a constitution in which power from a crankshaft is applied, via a gear train, to the pump of a torque converter whose turbine is coaxially connected to the input shaft of a gear transmission. On the other hand, a power transmitting unit for driving a generator by a crankshaft usually has a generator coaxially mounted on the crankshaft and hence if the arrangement of the torque converter disclosed in the above Japanese Patent Laid-Open No. S57-69163 is applied to the power transmitting unit of an all-terrain vehicle provided with the generator as it is, the crankshaft is placed out of balance in load at both its ends.

SUMMARY AND OBJECTS OF THE INVENTION

The present invention has been made in view of above circumstances, and it is an object of the present invention to provide an all-terrain saddle type vehicle capable of simplifying the constitution of a gear transmission using a torque converter and keeping load in balance at both ends of a crankshaft.

In order to accomplish the above object, a first aspect of the invention is an all-terrain saddle type vehicle including a gear transmission capable of selectively establishing a plurality of speed change steps. A transmitting unit is provided that is capable of transmitting power from a crankshaft rotatably supported by the crank case of an engine to the gear transmission. A generator is connected to the crankshaft. The transmitting unit is a torque converter having a pump rotated by the power from the crankshaft. The torque converter, a lock-up clutch mounted on the crank case side of the torque converter and capable of directly connecting the pump to the turbine of the torque converter and a driving gear rotating integrally with the turbine and capable of transmitting the output of the torque converter to the gear transmission are mounted on one end side of the crankshaft outside the crank case wherein the lock-up clutch is sandwiched between the torque converter and the driving gear and that the generator is mounted on the other end side of the crank shaft outside the crank case.

According to the constitution described above, it is possible to considerably reduce the number of speed change steps of the gear transmission, to simplify the constitution of the gear transmission, to improve durability, and to establish a maintenance-free all-terrain saddle type vehicle by using the torque converter having a torque amplifying function as the transmitting unit capable of transmitting power from the crankshaft to the gear transmission. Further, since the torque converter is mounted on one end side of the crankshaft and the generator is mounted on the other end side of the crankshaft, it is possible to keep the load in balance at both the ends of the crankshaft and to increase the power transmitting rigidity from the crankshaft to the gear transmission by compactly arranging the torque converter, the lock-up clutch, and the driving gear outside the crank case at the position near to the crank case.

A second aspect of the present invention includes a starting clutch capable of transmitting power between the pump of the torque converter and the crankshaft or interrupting the transmission of the power is arranged such that the torque converter is sandwiched between the starting clutch and the lock-up clutch. According to such a constitution, it is possible to compactly arrange a starting clutch capable of transmitting the power between the crankshaft and the torque converter or interrupting the transmission of the power according to the running condition of the all-terrain saddle type vehicle, the torque converter, and the lock-up clutch.

A third aspect of the present invention includes a valve system driving cam chain of a 4-cycle overhead cam type engine that is interposed between the driving gear and the crank case. According to such a constitution, it is possible to reduce the size of a power transmitting unit in the direction along the axis of the crank shaft by effectively arranging the valve system driving cam chain having a narrow width along the axial direction of the crankshaft in a space between the driving gear and the crank case.

A fourth aspect of the present invention includes a cover fixed to the crank case to form an operation chamber between itself and the crank case, and that the generator and the gear transmission both of which are arranged at the almost same position along the axial direction of the crankshaft are received in the operation chamber. According to such a constitution, it is possible to mount or dismount the generator and the gear transmission in the state where they are removed from the crank case and hence to easily maintain the generator and the gear transmission.

Further, a fifth aspect of the present invention includes an all-terrain saddle type vehicle that further includes a control unit for controlling the operation of the lock-up clutch such that the lock-up clutch is turned to the ON state immediately after the all-terrain vehicle starts in the state where the lowest speed change step in the forward direction is established in the gear transmission. According to such a constitution, since the torque converter is put into the lock-up state immediately after the all-terrain saddle type vehicle starts to eliminate the speed change range of the torque converter to produce a vehicle speed proportional to the rotational speed of the engine, it is convenient for performing work at a constant speed such as planting seeds, dusting agricultural chemicals, or the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
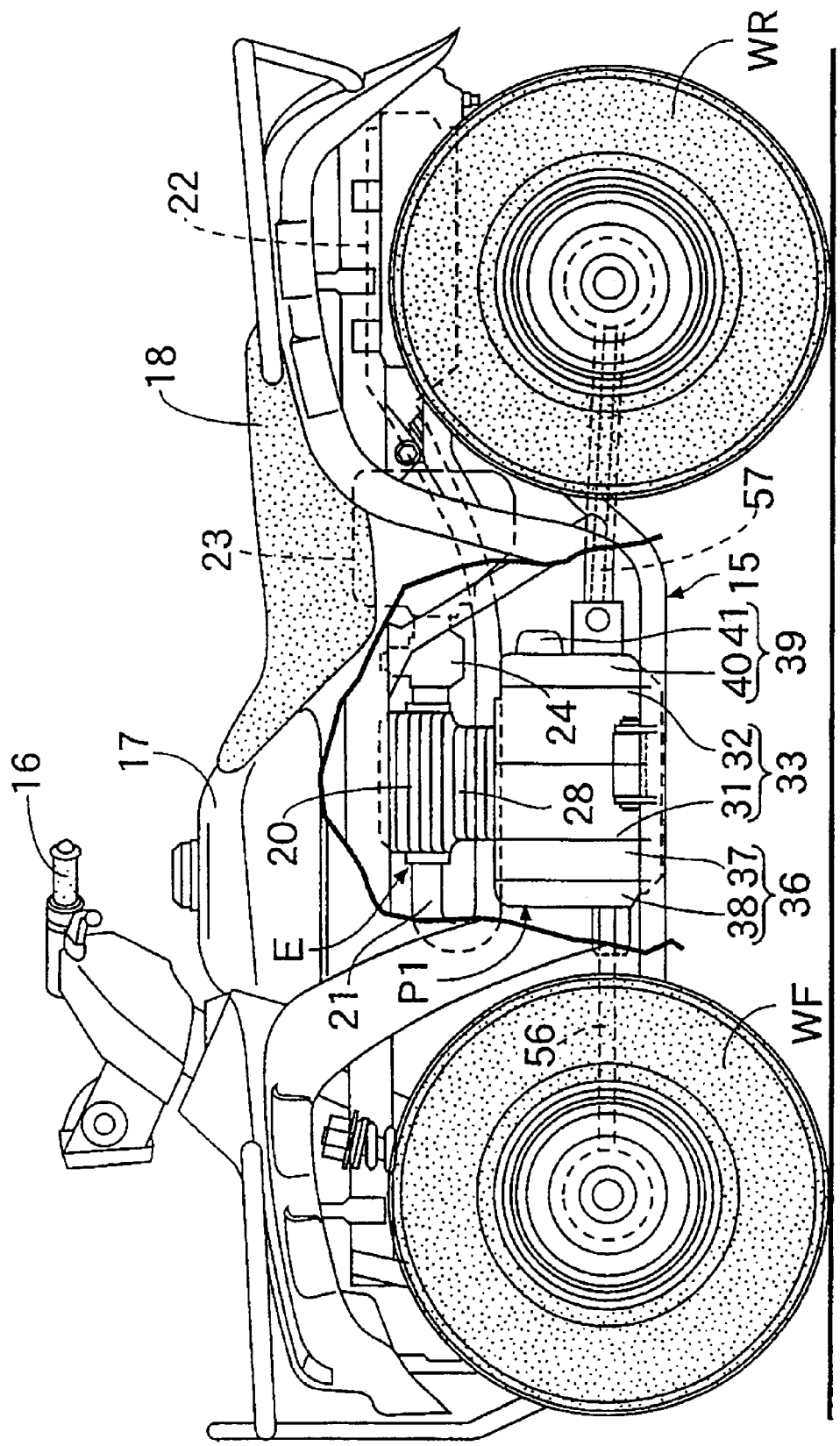
FIG. 1 is a side view of an all-terrain saddle type vehicle of the first preferred embodiment.

Preferred embodiments of the invention will be hereinafter described with reference to the accompanying drawings. As illustrated in FIG. 1, an all-terrain saddle type vehicle is provided with a vehicle body frame 15 constituted of welded pipes, a pair of left and right front wheels WF suspended at the front portion of the body frame 15 and provided with balloon type low pressure pneumatic tires, and a pair of left and right rear wheels WR suspended at the rear portion of the vehicle body frame 15 and provided with balloon type low pressure pneumatic tires. The all-terrain saddle type vehicle is provided with a steering handlebar 16 for steering the pair of left and right front wheels WF and arranged at the front end portion of the vehicle body frame 15, a fuel tank 17 arranged in the middle portion in the front-rear direction of the vehicle body frame 15, and a saddle type seat 18 on the vehicle body frame 15 on the rear side behind the fuel tank 17.

Figure 2:
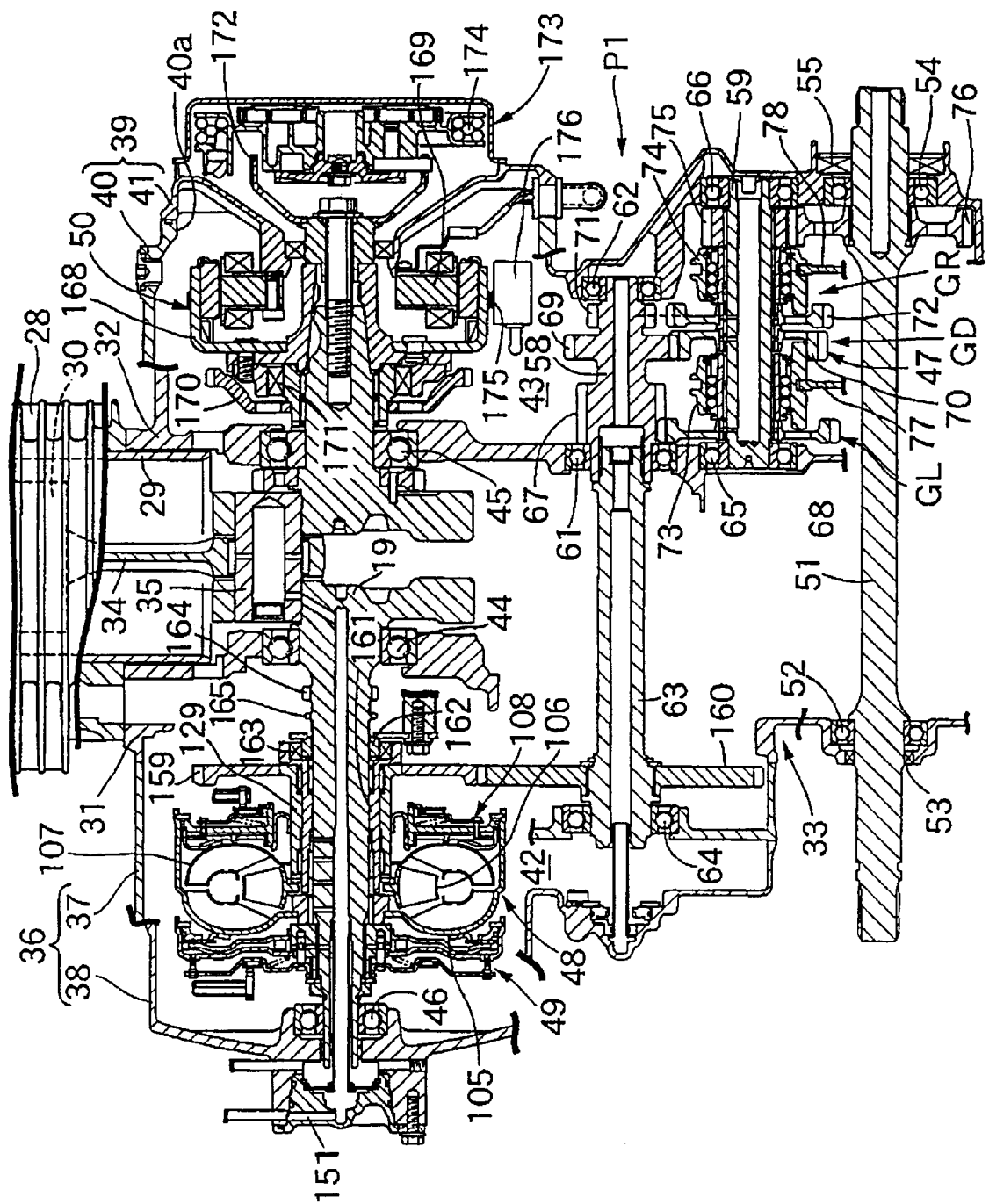
FIG. 2 is a vertical side view of a part of a power unit.

A power unit P1 including an engine E for driving the front wheels which are steering wheels and also driving wheels and the rear wheels which are driven wheels is mounted on the body frame 15 under the fuel tank 17 and the seat 18. The engine E is a four-cycle overhead cam type engine that includes a crankshaft 19 (see FIG. 2), for example, vertically arranged along the front-rear direction of the all-terrain saddle type vehicle, and an exhaust pipe 21 connected to an exhaust port (not shown) made in the front surface side of a cylinder head 20 of the engine E is curved 180 degrees to the right side of the vehicle body frame 15 and extends in the rear direction on the right side of the power unit P1 and is connected to an exhaust muffler arranged on the right side of the rear portion of the vehicle body frame 15.

An air cleaner 23 and a carburetor 24 connected to the air cleaner 23 are arranged under the seat 18 on the rear side of the engine E and the carburetor 24 is connected to an intake port (not shown) made in the rear surface side of the cylinder head 20.

The cylinder block 28 of the engine E is nearly vertically mounted slightly inclined to the right side of the vehicle body and the cylinder head 20 is coupled to the upper portion of the cylinder block 28. A piston 30 is slidably fitted in the cylinder liner 29 mounted on the cylinder block 28.

A crank case 33 including a front case semi-body 31 and a rear case semi-body 32 which are coupled to each other is coupled to the bottom portion of the cylinder block 28 such that the bottom portion of the cylinder liner 29 is placed into the crank case 33. The crankshaft 19 includes an axis along the front-rear direction of the all-terrain saddle type vehicle that is rotatably supported by the crank case 33, and the piston 30 is connected to the crankshaft 19 via a connecting rod 34 and a crank pin 35.

A front cover 36 forms a front operation chamber 42 between the front cover 36 and the front case semi-body 31 which is coupled to the front case semi-body 31 of the crank case 33 and a rear cover 39 which forms a rear operation chamber 43 between the rear cover 39 and the rear case semi-body 32 is coupled to the rear case semi-body 32 of the crank case 33.

The front cover 36 includes a first cover member 37 formed in the shape of a cylinder and extends forward from the front case semi-body 31 and a second cover member 38 closing the front opening of the first cover member 37. The rear cover 39 includes a third cover member 40 having an opening 40a in the top and covering almost the rear side of the rear case semi-body 32 and a fourth cover member 41 covering the front opening 40a.

A ball bearing 44 is provided between the crankshaft 19 and the front case semi-body 31 and a ball bearing 45 is mounted between the crankshaft 19 and the rear case semi-body 32. The front end portion of the crankshaft 19 projecting toward the front operation chamber 42 side from the front case semi-body 31 is rotatably supported by the second cover member 38 of the front cover 36 via the ball bearing 46.

The power unit P1 is provided with the above-mentioned engine E, a gear transmission 47 capable of selectively establishing a plurality of speed change steps, a torque converter 48 as a transmitting unit capable of transmitting power from the crankshaft 19 to the gear transmission 47, and a starting clutch capable of transmitting the power between the torque converter 48 and the crankshaft 19 or interrupting the transmission of the power. A lock-up clutch 108 is mounted on the crank case 33 side of the torque converter 48 and a generator 50 is coaxially coupled to the crankshaft 19.

The power outputted by the gear transmission 47 is transmitted to a propelling shaft 51 having an axis parallel to the crankshaft 19. A ball bearing 52 and a sealing member 53 are interposed between the front portion of the propelling shaft 51 and the front case semi-body 31 of the crank case 33 and a ball bearing 54 and a sealing member 55 are interposed between the rear portion of the propelling shaft 51 and the third cover member 40 of the rear cover 39.

The left and right front wheels WF are coupled to the front end portion of the propelling shaft 51 via a front propelling shaft 56 (see FIG. 1) and a front differential gear (not shown). The left and right rear wheels WR are coupled to the rear end portion of the propelling shaft 51 via a rear propelling shaft 57 (see FIG. 1) and a rear differential gear (not shown).

The gear transmission 47 has a low gear train GL, a driving gear train GD, and a reverse gear train GR which can be selectively changed and established, and also has an input shaft 58 and an output shaft 59 each of which has an axis parallel to the crankshaft 19 and a middle shaft (not shown), and is received in the rear operation chamber 43.

The input shaft 58 is rotatably supported by the rear case semi-body 32 and the third cover member 40 of the rear cover 39, and a ball bearing 61 is interposed between the front end portion of the input shaft 58 and the rear case semi-body 32, and a ball bearing 62 is interposed between the rear end portion of the input shaft 58 and the third cover member 40. The rear end of a transmitting shaft 63 rotatably extends, through the front case semi-body 31 of the crank case 33, between the first cover member 37 of the front cover 36 and the rear case semi-body 32 of the crank case 33 is coaxially coupled to the front end of the input shaft 58 such that it can not rotate relatively to the input shaft 58, and the power from the crankshaft 19 is transmitted to the input shaft 58 via the transmitting shaft 63. A ball bearing 64 is interposed between the first cover member 37 of the front cover 36 and the front end portion of the transmitting shaft 59.

The output shaft 59 is rotatably supported by the rear case semi-body 32 of the crank case 33 and the third cover member 40 of the rear cover 39, as is the case with the input shaft 58, and a ball bearing 65 is interposed between the front end portion of the output shaft 59 and the rear case semi-body 32 and a ball bearing 66 is interposed between the rear end portion of the output shaft 59 and the third cover member 40.

The low gear train GL is constituted of a driving gear 67 integrally formed with the input shaft 58 and a driven gear 68 rotatably supported by the output shaft 59 such that it can rotate relative to the output shaft 59 and is engaged with the driving gear 67. The driving gear train GD is constituted of a driving gear 69 integrally formed with the input shaft 58 and a driven gear 70 rotatably supported by the output shaft 59 such that it can rotate relative to the output shaft 59 and is engaged with the driving gear 69. The reverse gear train GR is constituted of a driving gear 71 integrally formed with the input shaft 58, a driven gear 72 rotatably supported by the output shaft 59 such that it can rotate relative to the output shaft 59, a first middle gear (not shown) engaged with the driving gear 71 and supported by a middle shaft, and a second middle gear (not shown) integrally formed with the first middle gear and engaged with the driven gear 72.

A dog clutch 73 is spline-fitted on the output shaft 59 between the driven gear 68 of the low gear train GL and the driven gear 70 of the driving gear train GD such that it can slide in the axial direction, and if the dog clutch 73 is engaged with the driven gear 68, the low gear train GL is established and if the dog clutch 73 is engaged with the driven gear 70, the driving gear train GD is established. A dog clutch 74 is spline-fitted on the output shaft 59 between the driven gear 72 of the reverse gear train GR and the ball bearing 66 such that it can slide in the axial direction, and if the dog clutch 74 is engaged with the driven gear 72, the reverse gear train GR is established.

A driving gear 75 is fixed to the rear end portion of the output shaft 59 in the rear operation chamber 43. On the other hand, a driven gear 76 is engaged with the driving gear 75 and is fixed to the rear end portion of the propelling shaft 51.

Figure 3:
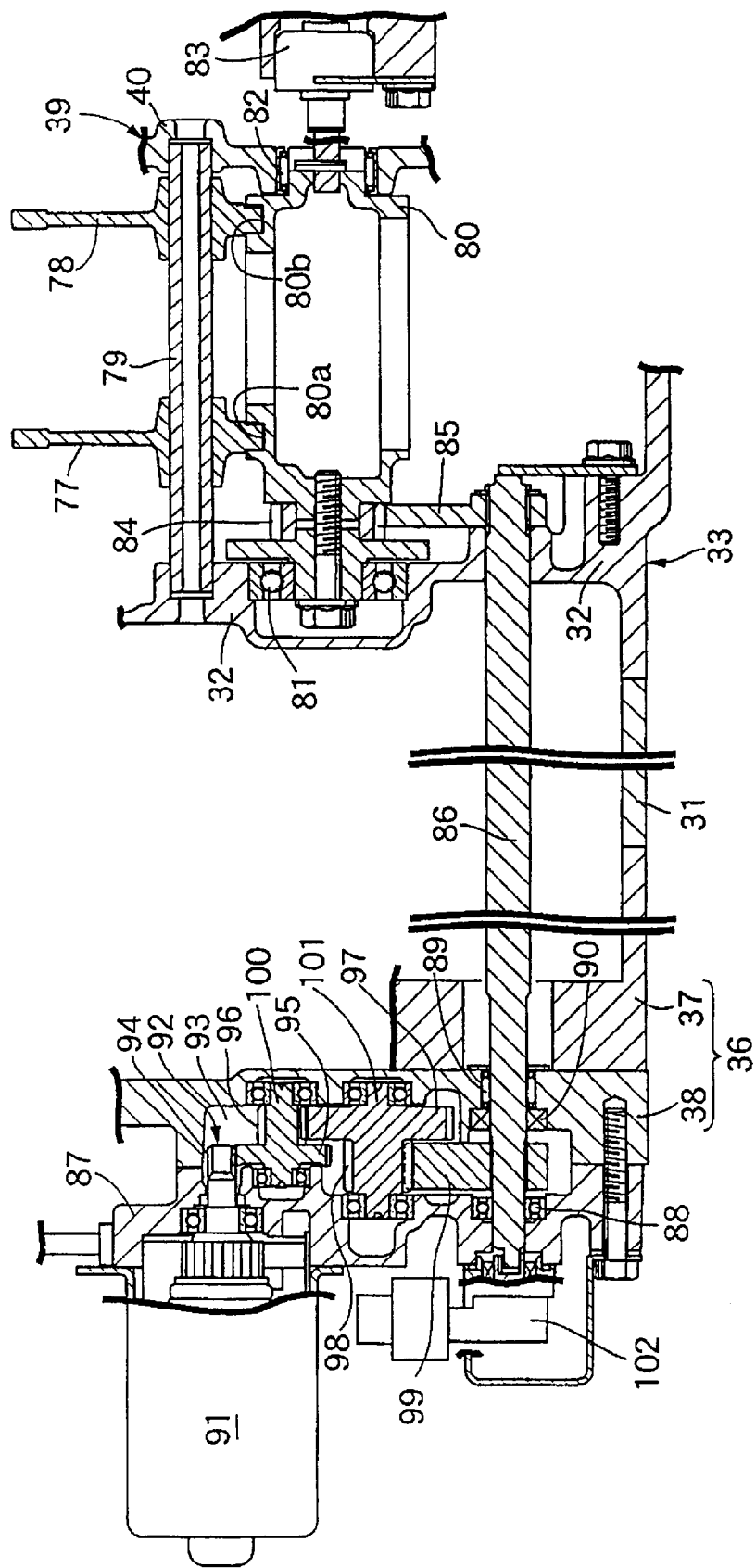
FIG. 3 is a vertical side view showing the constitution to switch the speed change steps of a gear transmission.

Referring now to FIG. 3 in combination, the dog clutches 73, 74 are supported by shift forks 77, 78. On the other hand, a shift fork shaft 79 having an axis parallel to the input shaft 58 and the output shaft 59 is provided between the rear case semi-body 32 of the crank case 33 and the third cover member 40 of the rear cover 39 and both the shift forks 77, 78 are supported by the shift fork shaft 79 such that they can slide in the axial direction. Both the shift forks 77, 78 are engaged with cam grooves 80a, 80b made in the outer peripheral portion of a shift drum 80 turning around an axis parallel to the shift fork shaft 79, respectively.

The front end portion of the shift drum 80 is turnably supported by the rear case semi-body 32 of the crank case 33 via a ball bearing 81, and the rear end portion of the shift drum 80 is turnably supported by the third cover member 40 of the rear cover 39 via a roller bearing 82.

If the shift drum 80 is turned to slide the shift forks 77, 78, one of the gear trains GL, GD, GR can be selectively established. The turning position of the shift drum 80, that is, a shift position is detected by a shift position detector 83 including a potentiometer and the potentiometer 83 is fixed to the third cover member 40 and is connected to the rear end of the shift drum 80.

A driven gear 84 is coaxially fixed to the front end portion of the shift drum 80 and a driving gear 85 which is a sector gear is engaged with the driven gear 84. This driving gear 85 is fixed to the rear end portion of a shift spindle 86 having an axis parallel to the shift fork shaft 79 and the shift drum 80, and the shift spindle 86 is rotatably passed through the front case semi-body 31 and the front cover 36. The front end portion of the shift spindle 86 is rotatably supported by a gear case 87 fastened to the second cover member 38 of the front cover 36 via a ball bearing 88, and the rear end portion of the shift spindle 86 is directly supported by the rear case semi-body 32. A roller bearing 89 and a sealing member 90 are interposed between the shift spindle 86 and the second cover member 38 of the front cover 36.

An electric motor 91 which can rotate in both forward and reverse directions is connected to the shift spindle 86 via a speed reducing gear train 92.

The electric motor 91 has an axis parallel to the shift spindle 86 and is mounted on a gear case 87 and the speed reducing gear train 92 is received in a gear chamber 93 formed between the second cover member 38 and the gear case 87.

The speed reducing gear train 92 includes a first speed reducing gear 94, a second speed reducing gear 95 engaged with the first speed reducing gear 94 mounted on the output shaft of the electric motor 91, a third speed reducing gear 96 rotating integrally with the second speed reducing gear 95, a fourth speed reducing gear 97 engaged with the third speed reducing gear 96, a fifth speed reducing gear 98 rotating integrally with the fourth speed reducing gear 97, and a sixth speed reducing gear 99 engaged with the fifth speed reducing gear 98 and turning with the shift spindle 86.

The second and third speed reducing gears 95, 96 are integrally formed with a first speed reducing shaft 100 rotatably supported by the second cover member 38 and the gear case 87, and the fourth and fifth speed reducing gears 97, 98 are integrally formed with a second speed reducing shaft 101 rotatably supported by the second cover member 38 and the gear case 87. The sixth speed reducing gear 99 is a sector gear and is fixed to the shift spindle 86.

The gear case 87 is provided with a rotational phase detecting device 102 which is a potentiometer and the rotational phase detecting device 102 is connected to the front end of the shift spindle 86.

Figure 4:
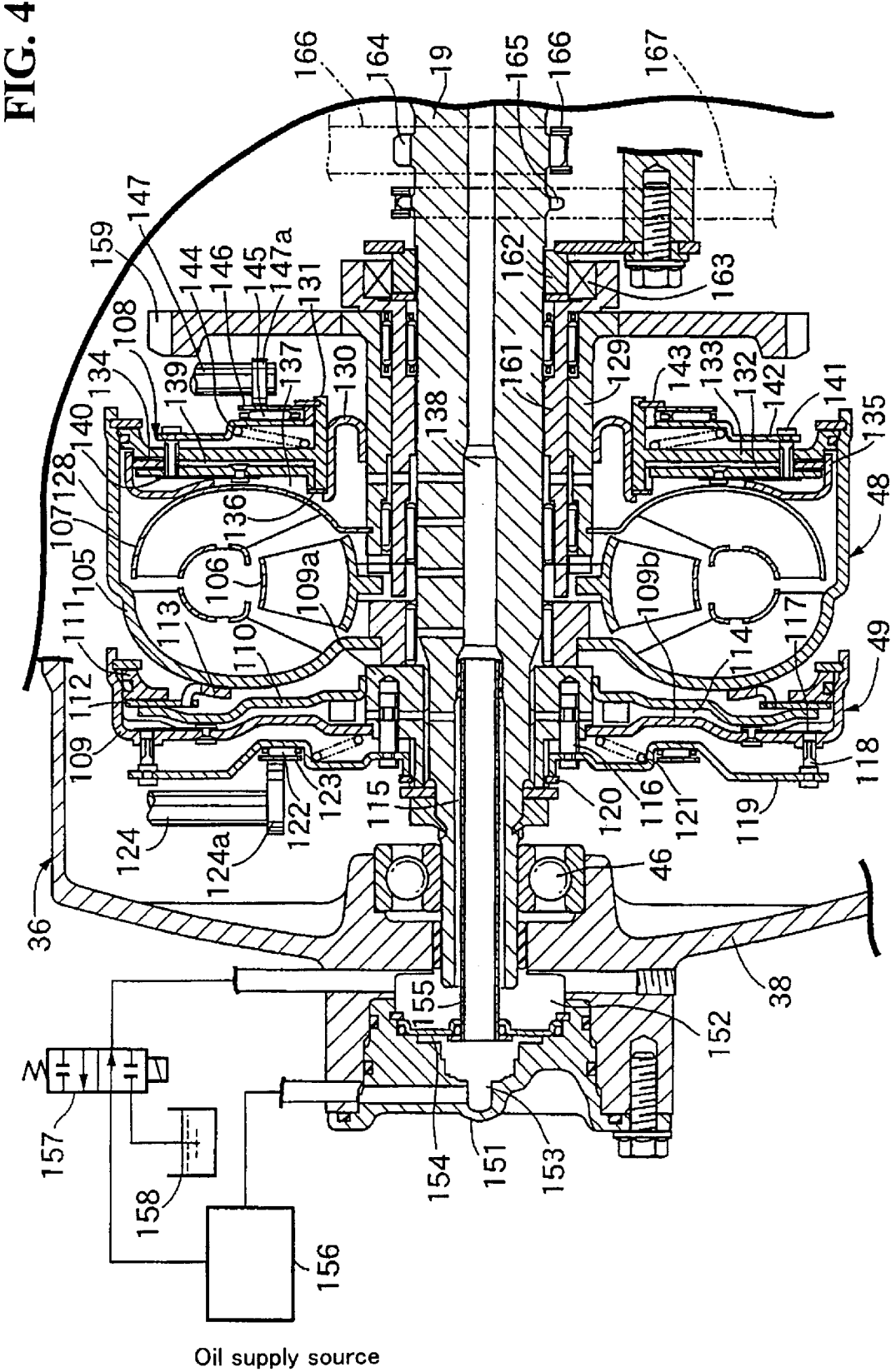
FIG. 4 is an enlarged view of a main part in FIG. 2.

In FIG. 4, the torque converter 48 is a conventional well known torque converter provided with a pump 105, a stator 106 and a turbine 107, and the pump 105 is arranged on the side of the second cover member 38 of the front cover 36 and is mounted on one end portion, that is, the front end portion of the crank shaft 19 in the front operation chamber 42. The starting clutch 49 is interposed between the pump 105 of the torque converter 48 and the crank shaft 19 such that it is arranged between the torque converter 48 and the second cover member 38, and a lock-up clutch 108 is mounted between the pump 105 and the turbine 107 at the position where the torque converter 48 is sandwiched between the lock-up clutch 108 and the starting clutch 49.

The starting clutch 49 is provided with a cylindrical clutch casing 109 having a boss 109a fixed to the crank shaft 19 at the center and an end wall 109b on the end portion opposite to the pump 105, a pressing plate 110 is slidably supported by the outer peripheral portion of the boss 109a and is received in the clutch casing 109, a pressed plate 111 is hermetically fixed to the opening end portion of the clutch casing 109, and a friction clutch plate 112 is interposed between the pressing plate 110 and the pressed plate 111, and a transmitting plate 113 is fixed to the pump 105 of the torque converter 48 and is spline-coupled to the inner peripheral portion of the friction clutch plate 112.

A hydraulic chamber 114 is formed between the clutch casing 109 and the pressing plate 110, and a spool valve 116 for connecting or disconnecting a first annular oil passage 115 is formed in the crank shaft 19 to or from the hydraulic chamber 114 and is provided in the boss 109a of the clutch casing 109. A reed valve 117 is mounted on the inner surface at the outer peripheral side of the end wall 109b of the clutch casing 109 and when the reed valve 117 is opened, the hydraulic oil in the hydraulic chamber 114 is discharged outside the clutch casing 109.

The spool valve 116 makes the hydraulic chamber 114 communicate with the first oil passage 115 when it is moved to the left position shown in FIG. 4 and interrupts the communication between the hydraulic chamber 114 and the first oil passage 115 when it is moved to the right position from the position shown in FIG. 4. A valve opening rod 118 for opening the reed valve 117 is passed through the outer peripheral side of the end wall 109b of the clutch casing 109 such that it can move in the axial direction, and when the valve opening rod 118 is at the left position shown in FIG. 4, the reed valve 117 is closed by its own resilience and when the valve opening rod 118 is moved to the right position shown in FIG. 4, the reed valve 117 is pressed and opened by the valve opening rod 118.

Figure 5:
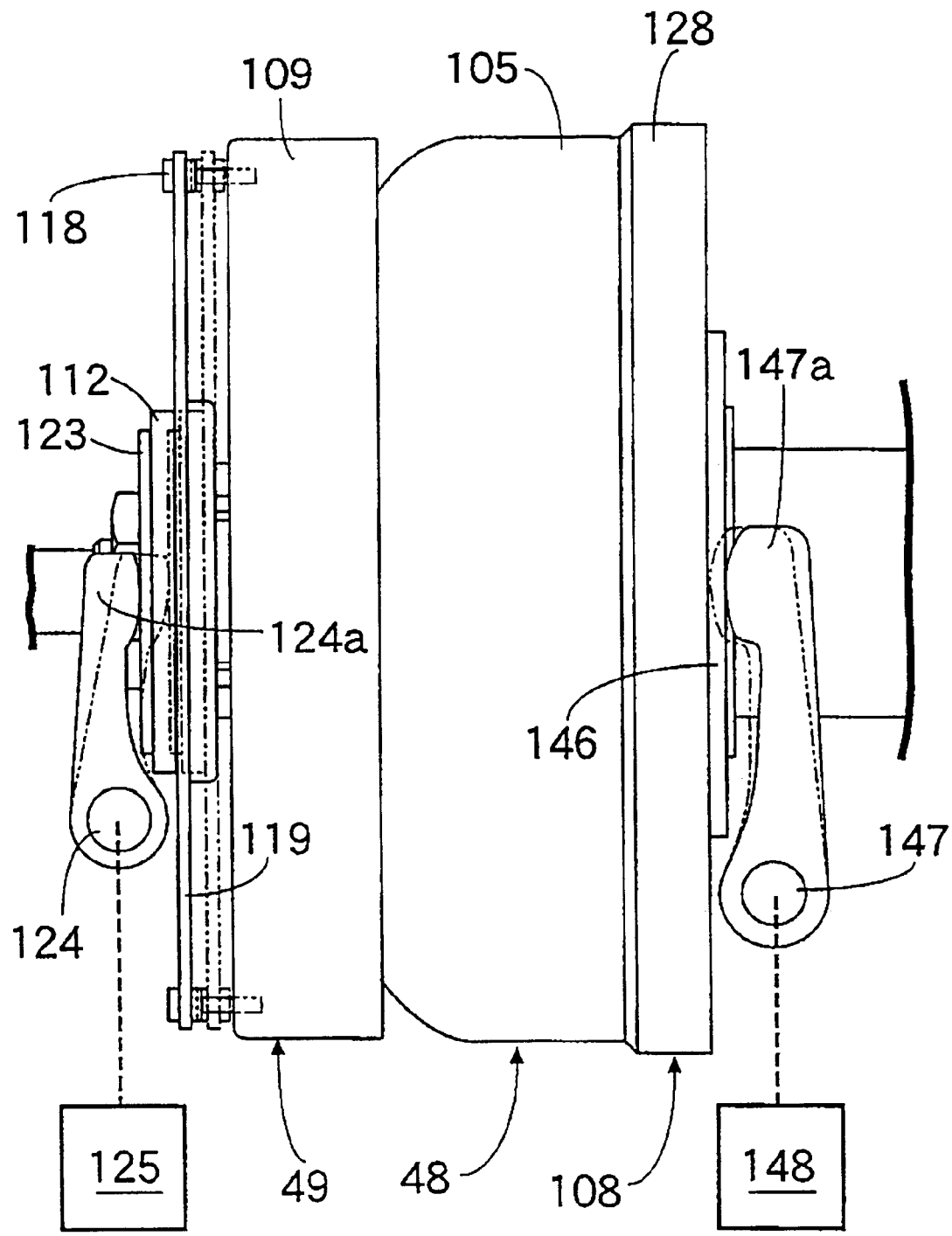
FIG. 5 is a plan view of a torque converter, a lock-up clutch, and a starting clutch.

Referring now to FIG. 5 in combination with FIG. 4, a valve operating plate 119 is connected commonly to the outside ends of the spool valve 116 and the valve opening rod 118, and the valve operating plate 119 is supported by the boss 109a of the clutch casing 109 such that it can slide in the left-right direction along the axis of the crank shaft 19. A stopper ring 120 for regulating the left position to which the valve operating plate 119 is moved is fitted in the boss 109a, and a returning spring 121 for urging the valve operating plate 119 toward the stopper ring 120 is interposed between the end wall 109b of the clutch casing 109 and the valve operating plate 119.

A pressing ring 123 is connected to the valve operating plate 119 on the side opposite to the end wall 109b of the clutch casing 109 via a release bearing 122, and an arm 124a fixed to a starting-clutch operating shaft 124 is put into contact with the pressing ring 123. Further, an electrically or electromagnetically operated starting-clutch actuator 125 is connected to the starting-clutch operating shaft 124 such that the starting-clutch operating shaft 124 can reciprocate.

According to such a starting clutch 49, when the starting-clutch actuator 125 is in a non-operating state and the valve operating plate 119 is held at the left side position shown in FIG. 4 by the returning spring 121, that is, when the spool valve 116 is in an open state and the reed valve 117 is in a closed state, if hydraulic pressure is applied to the first oil passage 115 and the hydraulic chamber 114, the pressing plate 110 presses the friction clutch plate 112 to the pressed plate 111, whereby these three pressing plate 110, friction clutch plate 112, and pressed plate 111 are connected to each other by friction. That is, the starting clutch 49 is turned to the ON state to transmit the rotational power of the crank-shaft 19 to the pump 105 of the torque converter 48 from the friction clutch plate 112.

When the starting clutch 49 is switched to the OFF state, the hydraulic pressure in the first oil passage 115 is relieved and the starting-clutch actuator 125 is operated to move the valve operating plate 119 to the right position, whereby the spool valve 116 is closed and the reed valve 117 is opened to relieve outside the hydraulic pressure in the hydraulic chamber 114. As a result, the hydraulic pressure in the hydraulic chamber 114 is rapidly reduced to release the friction connection between the pressing plate 110, the friction clutch plate 112, and the pressed plate 111. That is, the starting clutch 49 is turned to the OFF state to interrupt the transmission of torque from the crankshaft 119 to the torque converter 48.

Incidentally, when the starting clutch 49 is switched from the ON state to the OFF state, the hydraulic pressure in the hydraulic chamber 114 can be reduced by relieving the hydraulic pressure in the first oil passage 115 communicating with the hydraulic chamber 114 without opening the reed valve 117. However, the hydraulic oil is not smoothly discharged to the first oil passage 115 because centrifugal pressure is applied to the hydraulic pressure in the hydraulic chamber 114 by the rotation of the crank shaft 19 when the starting clutch 49 is in the ON state. Accordingly, the response of the starting clutch 49 when it is switched from the ON state to the OFF state can be made more excellent when it is switched by the reed valve 117 mounted on the outer peripheral side of the clutch casing 109.

The lock-up clutch 108 is provided with a cylindrical clutch casing 128 integrally connected to the outer peripheral portion of the pump 105 and covers the turbine 107. A support cylinder 130 is fixed to a cylindrical turbine shaft 129 which is coupled to the turbine 107 and coaxially surrounds the crank shaft 19. A cylindrical body 131 is fitted on the outer peripheral portion of the support cylinder 130 such that it can rotate relative to the support cylinder 130. A pressing plate 132, with an inner peripheral portion supported by the cylindrical body 131, is provided such that it can slide in the axial direction. A pressed plate 133 is provided with an inner peripheral portion integrally mounted on the cylindrical body 131 in opposition to the pressing plate 132 and with an outer peripheral portion hermetically fitted in and fixed to the opening end portion of the clutch casing 128. An annular friction clutch plate 134 is interposed between the pressing plate 132 and the pressed plate 133. The friction clutch plate 134 is spline-coupled to a transmitting plate 135 fixed to the outer surface of the turbine 107. The retracting position of the pressing plate 132 with respect to the pressed plate 133 is regulated by a stopper ring 136 fitted in the cylindrical body 131.

An oil chamber 137 communicating with the torque converter 48 is formed between the turbine 107 and the pressed plate 133 in the clutch casing 128 and is pressurized to a high pressure, as is the case with the inside of the torque converter 48, when the torque converter 48 is operated. The oil chamber 137 and the inside of the torque converter 48 are made to communicate with a second oil passage 138 coaxially formed in the crank shaft 19.

On the other hand, an oil chamber 139, with an outer peripheral portion regulated by the friction clutch plate 134, is formed between the pressing plate 132 and the pressed plate 133. A reed valve 140 is mounted on the inside surface of the outer peripheral portion of the pressing plate 132 and when the reed valve 140 is opened, the oil chamber 137 communicates with the oil chamber 139.

A valve opening rod 141 for opening the reed valve 140 is passed through the outer peripheral portion of the pressing plate 132 and the pressed plate 133 such that it can move in the axial direction. When the valve opening rod 140 is at the right position shown in FIG. 4, the reed valve 140 is closed by its own resilience and when the valve opening rod 141 is moved to the left position from the position shown in FIG. 4, the reed valve 140 is pressed and opened by the valve opening rod 141. Further, a plurality of grooves extending in the axial direction are made on the outer peripheral portion of the valve opening rod 141. When the valve opening rod 141 is at the left position where it opens the reed valve 140, the oil chamber 137 communicates with the oil chamber 139 via the grooves and when the valve opening rod 141 is at the right position where it closes the reed valve 140, the communication between the oil chamber 137 and the oil chamber 139 is interrupted and the oil chamber 139 is relieved outside the pressed plate 133 via the grooves.

A valve operating plate 142 is connected to the outer end of the valve opening rod 141 and is supported by the cylindrical body 131 such that it can slide in the left-right direction along the axis of the crank shaft 19. A stopper ring 143 for regulating the right position of the valve operating plate 142 is fitted in the cylindrical body 131 and a returning spring 144 for urging the valve operating plate 142 towards the stopper ring 143 is interposed between the pressed plate 133 and the valve operating plate 142.

A pressing ring 146 is connected to the valve operating plate 142 on the side opposite to the pressing plate 133 via release bearing 145 and an arm 147a mounted on the lock-up clutch operating shaft 147 is put into contact with the pressing ring 146. Further, an electrically or electromagnetically operated lock-up clutch actuator 148 is connected to the lock-up clutch operating shaft 147 such that the lock-up clutch operating shaft 147 can turn reciprocatively.

According to such a lock-up clutch 108, when the lock-up clutch actuator 148 is in an operating state and the valve operating plate 142 is held at the left side position shown in FIG. 4 against the returning spring 144, that is, when the reed valve 140 is open, the hydraulic pressure in the oil chamber 137 becomes equal to that in the oil chamber 139 and hence the pressing plate 132 does not press the friction clutch plate 134 to the pressed plate 133, and the friction connection between the pressing plate 132, the friction clutch plate 134, and the pressed plate 133 are relieved. That is, the lock-up clutch 108 is in the OFF state and the rotational power of the crank shaft 19 is amplified by the torque converter 48 and is outputted from the turbine shaft 129.

When the lock-up clutch 108 is switched to the ON state, the lock-up clutch actuator 148 is put in a non-operating state and the valve operating plate 142 is moved to the right position by the spring force of the returning spring 144, whereby the reed valve 140 is closed to relieve the hydraulic pressure in the hydraulic chamber 114 outside the pressed plate 133. As a result, by means of the hydraulic pressure in the hydraulic chamber 137, the pressing plate 132 presses the friction clutch plate 134 to the pressed plate 133 to connect the pressing plate 132, the friction clutch plate 134 and the pressed plate 132 by friction. That is, the lock-up clutch 108 is turned to the ON state to directly connect the pump 105 of the torque converter 48 to the turbine 107.

Incidentally, a cap 151 opposite to the front end of the crank shaft 19 is fastened to the second cover member 38 of the front cover 36 and a partition plate 154 is provided inside the cap 151 to form a first oil chamber 152 between the second cover member 38 and the partition plate 154 and a second oil chamber 153 between the partition plate 154 and the cap 151, wherein the first oil chamber 152 is separated from the second oil chamber 153.

The front end portion of a pipe 155 put into the crank shaft 19 is hermetically supported by the partition plate 154 and the first oil passage 115 is formed annularly between the pipe 155 and crank shaft 19 such that it communicates with the first oil chamber 152 and the second oil passage 138 is formed coaxially in the crank shaft 19 such that it communicates with the second oil chamber 153 via the pipe 155. Further, the second oil passage 138 not only communicates with the torque converter 48, but also it is used to lubricate the crank pin 35.

The second oil chamber 153 communicates with an oil supply source 156 including an oil pump and the like and a starting clutch control valve 157 is connected to the first oil chamber 152. The starting clutch control valve 157 is an electromagnetic valve capable of switching between the state where the first oil chamber 152, that is, the first oil passage 115 communicates with the oil supply source 156 and the state where the first oil chamber 152, that is, the first oil passage 155 communicates with the an oil storage 158 in the bottom portion of the crank case 33.

A cylindrical stator shaft 161 coupled to the stator 106 of the torque converter 48 is relatively rotatably supported by the crank shaft 19 and a turbine shaft 129 coaxially surrounding the stator shaft 161 is relatively rotatably supported by the stator shaft 161.

A driving gear 159 is fixed to the turbine shaft 129 and the driving gear 159 is in mesh with a driven gear 160 fixed to a transmitting shaft 63 coaxially connected to the input shaft 58 of the gear transmission 47. Further, the driving gear 159 is fixed to the turbine shaft 129 outside the crank case 33 such that the lock-up clutch 108 is sandwiched between driving gear 159 and the torque converter 48 and is integrally rotated with the turbine shaft 129.

A one-way clutch 163 for allowing the stator shaft 161 and the stator 106 to rotate in one direction is interposed between a support member 162 fixed to the front case semi-body 31 of the crank case 33 and the stator shaft 161.

A valve system driving sprocket 164 and an oil pump driving sprocket 165 are integrally formed with the crank shaft 19 between the front case semi-body 31 of the crank case 33 and the driving gear 159, wherein the valve system driving sprocket 164 is adjacent, in the axial direction, to the oil pump driving sprocket 165, and a valve system driving cam chain 166 for transmitting the power from the crank shaft 19 to a valve system cam (not shown) at a speed reducing ratio is looped around the valve system driving sprocket 164 and a oil pump driving cam chain 167 for transmitting the power from the crank shaft 19 to an oil pump (not shown) is looped around the oil pump driving sprocket 165. That is, the valve system driving cam chain 166 and the oil pump driving cam chain 167 are interposed between the driving gear 159 and the crank case 33.

Referring now to FIG. 2 again, the rotor 168 of the generator 50, which is arranged at the almost same position as the gear transmission 47 along the axis of the crank shaft 19 and is received in the rear operation chamber 43, is fixed to the rear end portion of the crank shaft 19 projected into the rear operation chamber 43 from the rear case semi-body 32 of the crank case 33 and the stator 169 of the generator 50 is fixed to the fourth cover member 41 of the rear cover 39.

A starting gear 170 connected to a starter motor (not shown) is relatively rotatably supported by the crank shaft 19 at the position adjacent to the rotor 168 of the generator 50 and the starting gear 170 is connected to the rotor 168 via a one-way clutch 171. If the starter motor is operated to drive the starting gear 170, the crank shaft 19 can be cranked via the one-way clutch 171 and the rotor 168 and when the engine E is started by the cranked crank shaft 19, the one-way clutch 171 is set free to interrupt the transmission of power from the rotor 168 to the starting gear 170.

A starting wheel 172 is fixed to the rearmost end of the crank shaft 19 and a recoil starter capable of engaging with the starting wheel 172 by a ratchet is mounted on the fourth cover member 40 of the rear cover 39. Accordingly, the crank shaft 19 can be cranked also by pulling the rope 174 of the recoil starter 173.

A plurality of projections 175 are fixed to the outer periphery of the rotor 168 and a rotational speed sensor 176 for detecting the rotational speed of the crank shaft 19 by detecting the projections 175 is mounted on the fourth cover member 40 of the rear cover 39 such that it is opposed to the projections 175.

Figure 6:
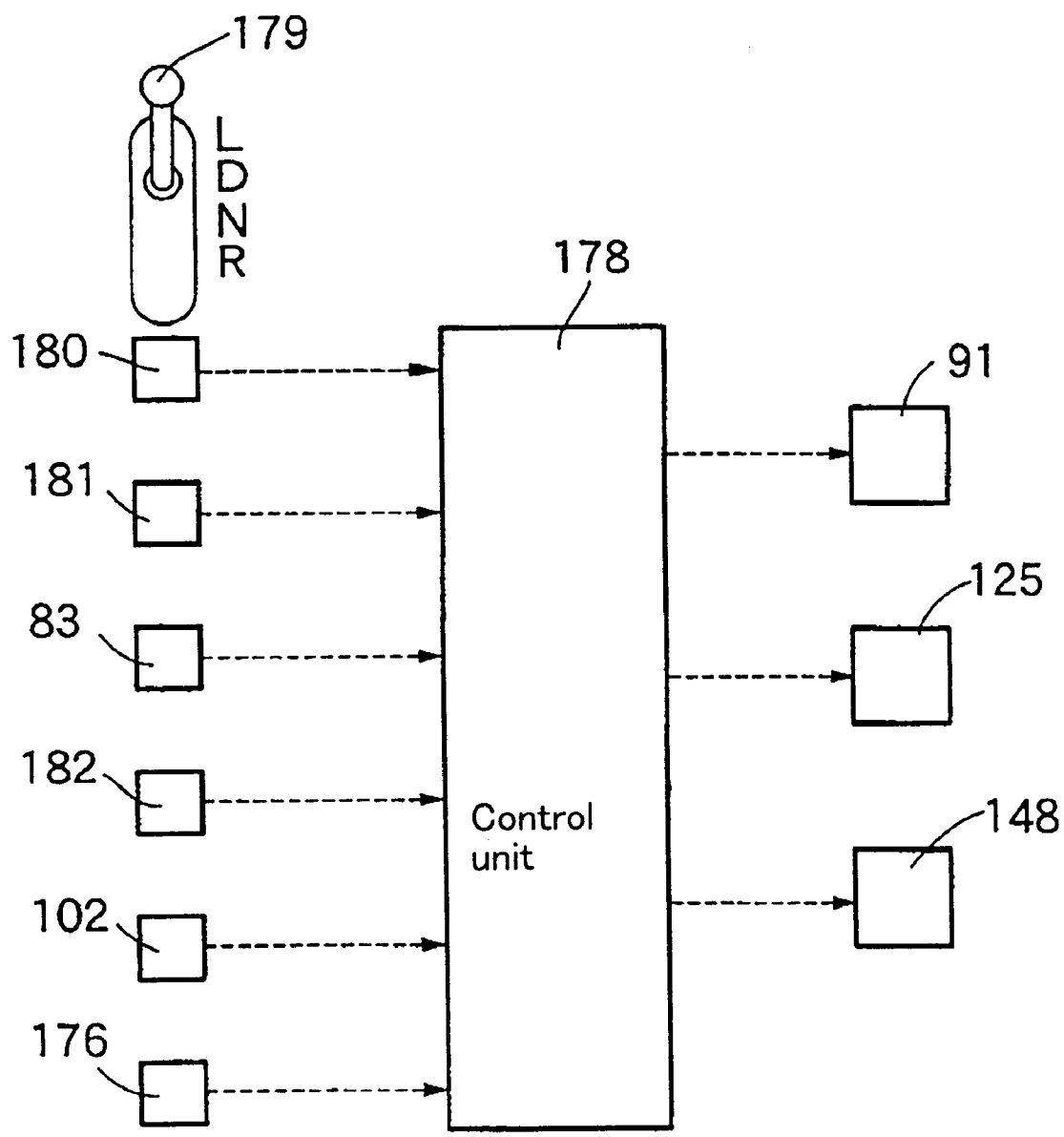
FIG. 6 is a block diagram showing the constitution of a control system.

In FIG. 6, the electric motor 91 for driving the gear transmission 47, the starting clutch actuator 125, the lock-up clutch actuator 148, the starting clutch control valve 157 are controlled by a control unit 178, and to the control unit 178 are inputted the detection signal of a selected position detector 180 for detecting the operation position of an operating member 179 such as a selecting lever capable of changing a shift position to four positions of L, D, N, R, the detecting signal of a throttle sensor 181 for detecting the throttle opening of the engine E, and the detecting signals of a shift position detector 83, a vehicle speed sensor 182, the rotational phase detecting device 102, and the rotational speed sensor 176.

When the L position is selected by the operating member 179, the control unit 178 controls the electric motor 91 to establish the low gear train GL of the gear transmission 47, and when the D position is selected by the operating member 179, it controls the electric motor 91 to establish the driving gear train GD of the gear transmission 47, and when the R position is selected by the operating member 179, it controls the electric motor 91 to establish the reverse gear train GR of the gear transmission 47, and when the N position is selected by the operating member 179, it controls the electric motor 91 so that none of gear trains GL, GD, GR is established by gear transmission 47.

When the position L, D, or R is selected by the operating member 179, the control unit 178 controls the starting clutch control valve 157 and the starting clutch actuator 125 so that the starting clutch 49 is in a power transmitting state, but when the position N is selected by the operating member 179, the control unit 178 controls the starting clutch control valve 157 and the starting clutch actuator 125 so that the starting clutch 49 is in the state where the power is not transmitted.

Further, when the operating member 179 is operated to switch between the positions L, D, N, R, the control unit 178 controls the starting clutch control valve 157 and the starting clutch actuator 125 in consideration of the detection signals of the throttle sensor 181, the shift position detector 73, the vehicle speed sensor 83, and the rotational speed sensor 176 to change the starting clutch 49 from the state where the power is not transmitted to the state where the power is transmitted.

Here, assuming that after the engine E is started with the shift position set at N, the shift position is shifted to D by the operating member 179, the control unit 178 controls the electric motor 91 so as to establish the driving gear train GD of the gear transmission 47, but if a driver does not open the throttle, the control unit 178 controls the starting clutch control valve 157 and the starting clutch actuator 125 so that the starting clutch 49 is turned to the OFF state. When it is detected by the throttle sensor 181 that the driver opens the throttle, the control unit 178 controls the starting clutch control valve 157 and the starting clutch control actuator 125 so that the starting clutch 49 is turned to the ON state to transmit the power from the crank shaft 19 to the pump 105 of the torque converter 48, whereby the all-terrain vehicle starts to moving forward at very low speeds by the creep of the torque converter 48. If the rider further opens the throttle, the all-terrain saddle type vehicle increases its forward speed. Further, if the rider closes the throttle to reduce the speed to a certain speed or less, the control unit 178 controls the starting clutch control valve 157 and the starting clutch control actuator 125 so that the starting clutch 49 is turned to the OFF state to stop the all-terrain saddle type vehicle.

During operation, an operator repeatedly starts and stops an all-terrain saddle type vehicle because the operator is patrolling a fence in a pasture or maintaining sprinklers arranged in the fields, and the operator often leaves the all-terrain saddle type vehicle because of work that is required to be performed. Accordingly, if the starting clutch 49 is turned to the OFF state at the shift position N, as is the case with the torque converter mounted on a passenger vehicle, the vehicle is moved by the creep of the torque converter at the shift position D. Accordingly, the rider needs to operate the operating member 179 to select the shift position N before the person leaves the vehicle. However, if the starting clutch 49 is switched between the ON state and the OFF state by the detection values of the throttle sensor 181, as described above, the starting clutch 49 is turned to the OFF state by closing the throttle even if the shift position is at D, whereby the vehicle is stopped. This eliminates the need for operating the shift lever when the operator leaves the vehicle and is very convenient for the operator.

In this connection, it is recommended that a steering handlebar 16 should be provided with a switch for driving the starting clutch 49 in addition to the throttle sensor 181 for detecting the operator's operation of opening the throttle and that the operator operate the switch to switch the starting clutch 49 between the OFF state and the ON state. If the steering handlebar is provided with the switch, the operator can turn the starting clutch 49 to the ON state without operating the throttle. This is convenient for the operator when the operator moves the all-terrain saddle type vehicle or moves it onto a muddy field.

Further, the control unit 178 determines the data obtained by the vehicle speed sensor 182 and the rotational speed sensor 176 at the shift position D, and when the rotational speed of the pump 105 of the torque converter 48 is nearly equal to that of the turbine 107, the control unit 178 controls the lock-up clutch actuator 148 to turn the lock-up clutch 108 to the ON state. This connects the pump 105 of the torque converter 48 directly to the turbine 107 to reduce the fuel consumption in the cruise running state and to produce direct running feeling.

The control unit 178 controls the lock-up clutch actuator 148 at the shift position L in which a large speed reducing ratio is produced so that the starting clutch 49 is turned to the ON state and that the lock-up clutch 108 is turned to the ON state immediately after the vehicle starts to move. This eliminates the speed change range of the torque converter 48 and produces the vehicle speed proportional to the rotational speed of the engine E, which results in easily running the vehicle at a constant speed. This is suitable for work performed by the all-terrain saddle type vehicle at a constant speed such as planting seeds in the fields, dusting agricultural chemicals, or the like.

Next, describing the operation of the first preferred embodiment, because the torque converter 48 having a torque amplifying function is used as the transmitting device capable of transmitting power from the crank shaft 19 to the gear transmission 47, it is possible to relatively reduce the number of speed change steps of the gear transmission 47 and hence to simplify the constitution of the gear transmission 47. Further, the power transmitting system from the starting clutch 49 to the gear transmission 47 can be arranged in a closed space covered by the crank case 33, the front cover 8 and the rear cover 39, and such an outside air introducing structure for cooling as is provided in a belt conveyer mechanism is not required. Accordingly, even when the all-terrain vehicle runs in muddy water, it is not required to take the entry of the muddy water into account, which results in improving the durability of the vehicle and making the vehicle maintenance-free.

Further, since the torque converter 48 is fixed to the one end side (the front end side in this preferred embodiment) of the crank shaft 19 and the generator 50 is mounted on the other end side of the crank shaft 19, it is possible to balance the load at both the ends of the crank shaft 19.

Furthermore, since the torque converter 48, the lock-up clutch 108 mounted on the crank case 33 side of the torque converter 48, and the driving gear 159 are mounted on the front end side of the crank shaft 19, outside the crank case 33, such that the lock-up clutch 108 is sandwiched between the torque converter 48 and the driving gear 159, the torque converter 48, the lock-up clutch 108 and the driving gear 159 can be compactly arranged near to the crank case 33, outside the crank case 33, which can increase the power transmission rigidity from the crank shaft 19 to the gear transmission 47.

Further, since the starting clutch 49 capable of transmitting power between the pump 105 of the torque converter 48 and the crank shaft 19 or interrupting the transmission of the power between them is arranged such that the torque converter 48 is sandwiched between the starting clutch 49 and the lock-up clutch 108, the starting clutch 49 is capable of transmitting the power between the pump 105 of the torque converter 48 and the crank shaft 19 or interrupting the transmission of the power, the torque converter 48 and the lock-up clutch 108 can be compactly arranged.

Still further, since the valve system driving cam chain 166 of the 4-cycle overhead cam type engine E is arranged between the driving gear 159 and the crank case 33, the valve system driving cam chain 166 whose width is narrow in the axial direction of the crank shaft 19 can be effectively arranged in a space between the driving gear 159 and the crank case 33, which results in reducing the size of the power transmitting unit in the direction along the axis of the crank shaft 19.

In addition, since the generator 50 and the gear transmission 47 which are arranged at almost the same position along the direction of the axis of the crank shaft 19 are received in the rear operation chamber 43 formed between the crank case 33 and the rear cover 39 coupled to the crank case 33, it is possible to mount or dismount the generator 50 and the gear transmission 47 in a state where the rear cover 39 is removed from the crank case 33. This facilitates the maintenance work of the generator 50 and the gear transmission 47.

Figure 7:
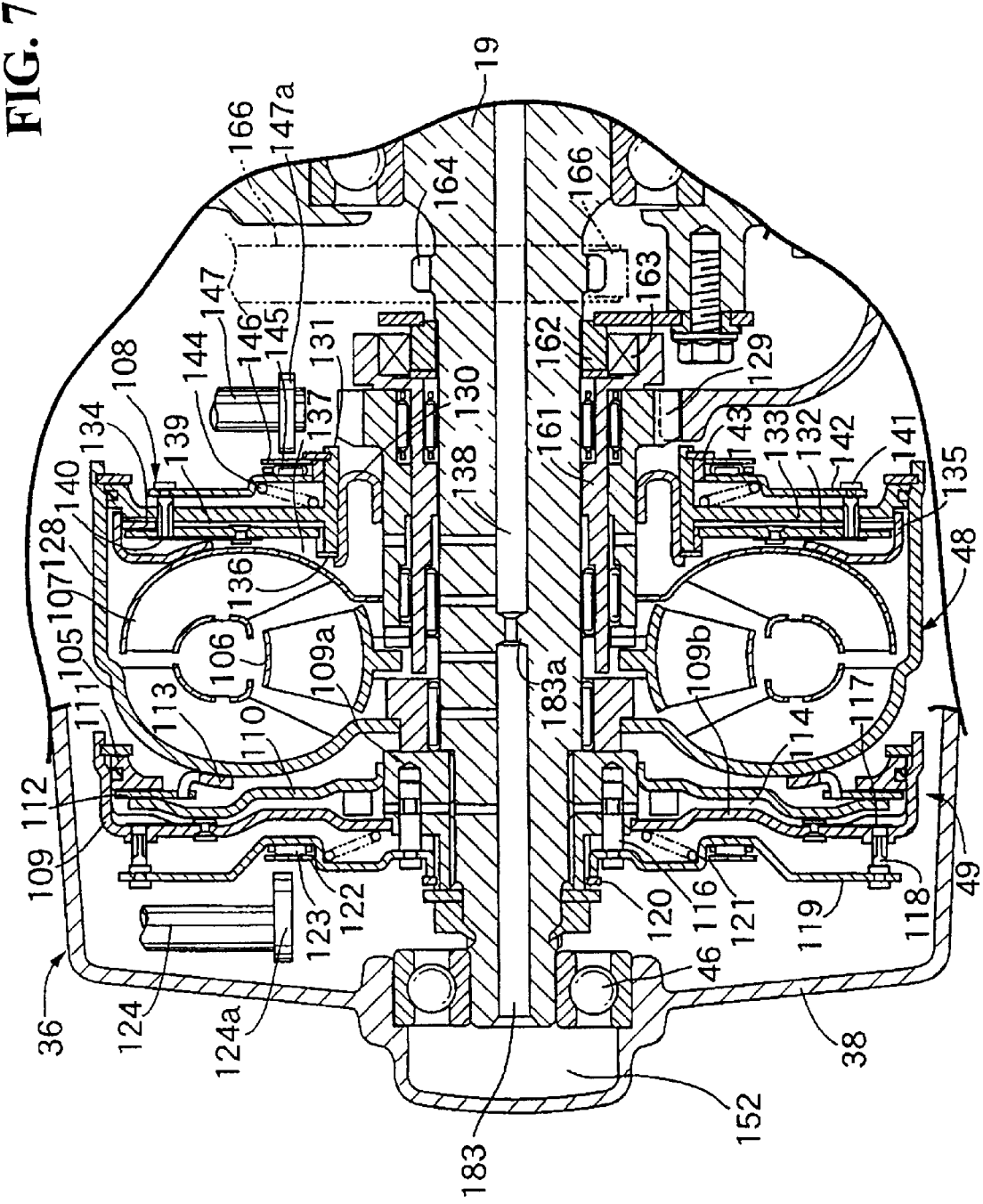
FIG. 7 is a cross sectional view corresponding to FIG. 4 of the second preferred embodiment.

In a second preferred embodiment in accordance with the present invention, as shown in FIG. 7, a single oil passage 183 which is common to the starting clutch 49, the torque converter 48, and the lock-up clutch 108 may be coaxially made in the crank shaft 19, and a throttle 183a is made in the oil passage 183 at the position between a portion communicating with the inside of the torque converter 48 and a portion communicating an oil chamber 137 between the turbine 107 of the torque converter 48 and the lock-up clutch 108.

In this case, in the starting clutch 49, when the valve operating plate 119 is held at the left position in FIG. 7 by the returning spring 121, that is, the spool valve 116 is open and the reed valve 117 is closed, if the crank shaft 19 is rotated in 30 response to the start of the engine E, centrifugal force is applied to the hydraulic oil in the hydraulic chamber 114 and the pressing plate 110 presses the friction clutch plate 112 to the pressed plated III to connect these three plates to each other by friction. That is, the starting clutch 49 is turned to the ON state to transmit the rotational power of the crank shaft 19 to the pump 105 of the torque converter 48 from the friction clutch plate 112.

When the valve operating plate 119 is moved to the left position, the spool valve is closed and the reed valve 117 is opened to relieve the hydraulic pressure in the hydraulic chamber 114 outside the clutch casing 109 to reduce the hydraulic pressure in the hydraulic chamber 114, whereby the pressing plate 110, the friction clutch plate 112, and the pressed plate 111 are relieved from the friction connection to turn the starting clutch 49 to the OFF state to interrupt the transmission of torque from the crank shaft 19 to the torque converter 48.

On the other hand, the lock-up clutch 108 can be switched between the ON state and the OFF state by moving the valve operating plate 142 to the left position or the right position in FIG. 7.

Figure 8:
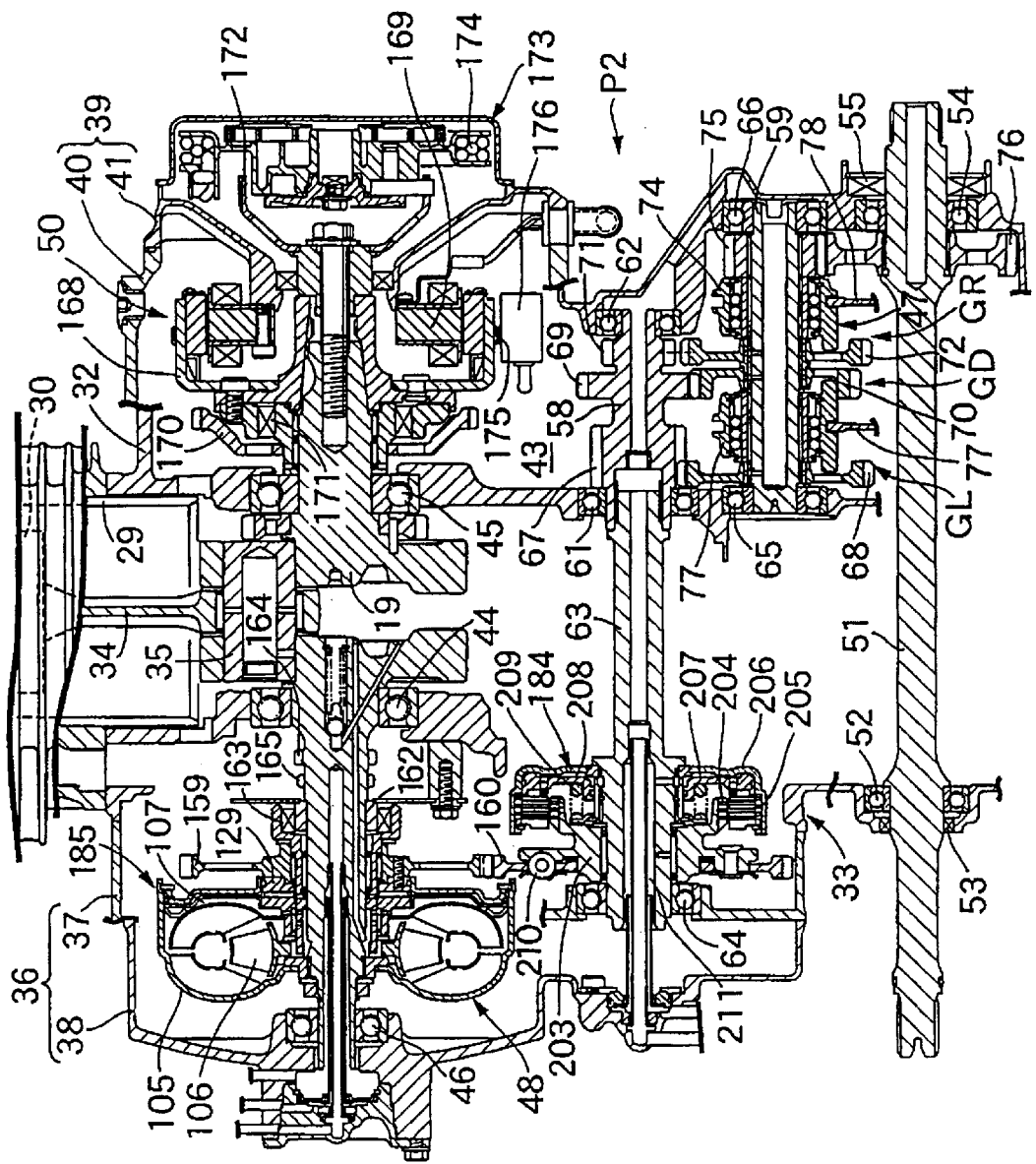
FIG. 8 is a vertical side view of a part of a power unit corresponding to FIG. 2 of the third preferred embodiment.
Figure 9:
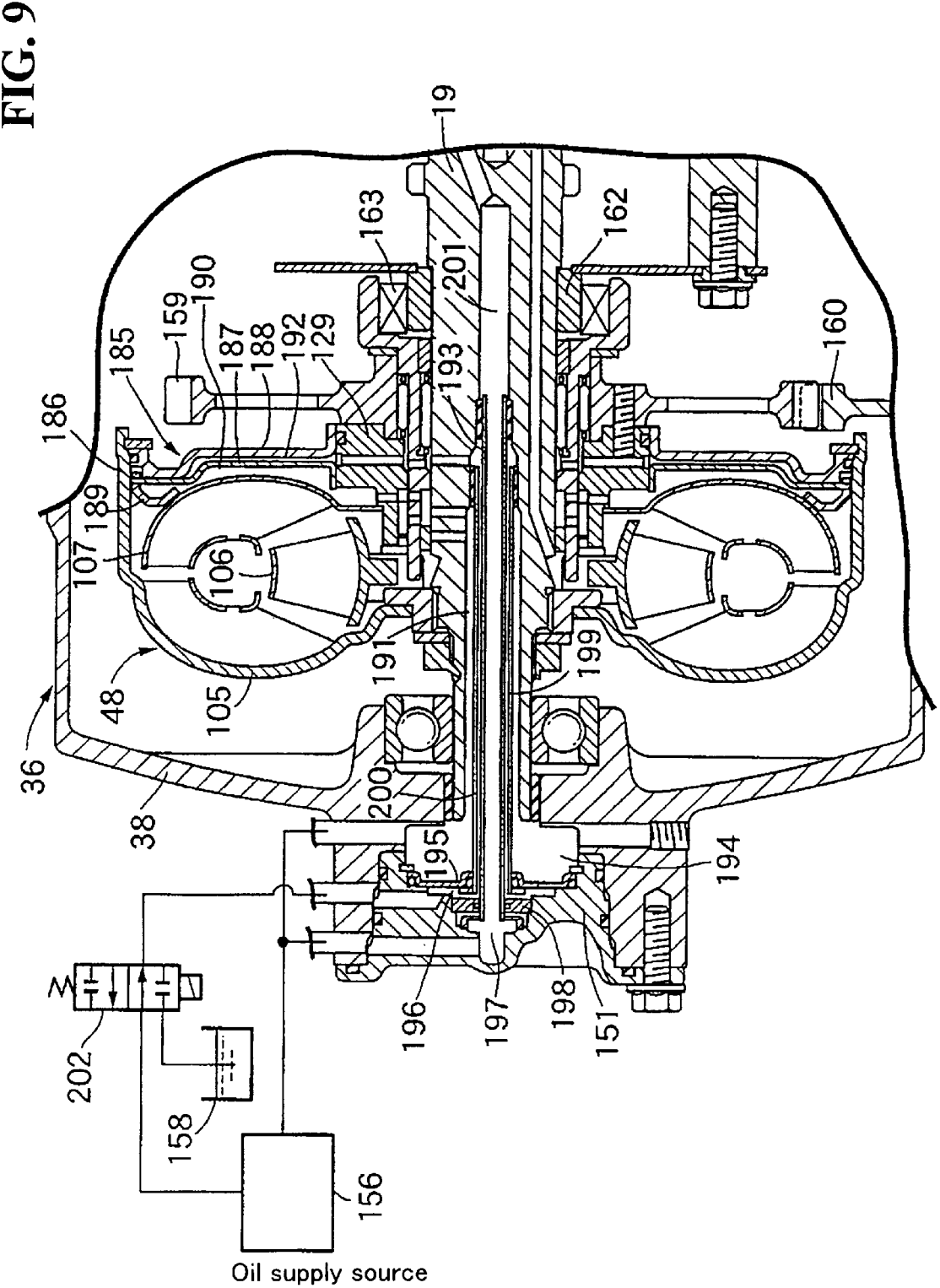
FIG. 9 is an enlarged view of a main part in FIG. 8.

FIG. 8 and FIG. 9 show a third preferred embodiment in accordance with the present invention. FIG. 8 is a vertical side view of a part of a power unit corresponding to FIG. 2. FIG. 9 is an enlarged view of a main part in FIG. 8.

The power unit P2 is provided with an engine E, a gear transmission 47 capable of selectively establishing a plurality of speed change steps, a torque converter 48 capable of transmitting the power from a crank shaft 19 to the gear transmission 47 and provided with a lock-up clutch 185, and a starting clutch 184 capable of transmitting the power between the torque converter 48 and the crank shaft 19 or interrupting the transmission of the power.

The torque converter 48 is mounted on the front end portion of the crank shaft 19 in a front operation chamber 42 and a generator 50 is mounted on the other end portion, that is, the rear end portion of the crank shaft 19 in the rear operation chamber 43.

A lock-up clutch 185 is provided with a cylindrical clutch casing 186 integrally formed with the outer peripheral portion of a pump 105 and covering a turbine 107, a pressing plate 187 whose inner peripheral portion is supported by a cylindrical turbine shaft 129 coaxially surrounding the crank shaft 19 such that it can slide in the axial direction, and a pressed plate 188 whose inner peripheral portion is hermetically supported opposite to the pressing plate 187 by the turbine shaft 129 and whose outer peripheral portion is hermetically fitted in and fixed to the open end portion of a clutch casing 186, and the pressing plate 187 is spline-coupled to the transmitting plate 189 fixed to the outer surface of the turbine 107.

An oil chamber 190 communicating with the inside of the torque converter 48 is formed between the turbine 107 and the pressed plate 188 in the clutch casing 186, and when the torque converter 48 is operated, the oil chamber 190 is pressurized to a high pressure, as is the case with the inside of the torque converter 48. The oil chamber 190 and the torque converter 48 communicate with a first oil passage 191 coaxially formed in the crank shaft 19.

On the other hand, a hydraulic oil chamber 192 is formed between the pressing plate 187 and the pressed plate 188 and the hydraulic oil chamber 192 communicates with a second oil passage 193 coaxially formed in the crank shaft 19.

According to such a lock-up clutch 185, when the hydraulic pressure in the hydraulic chamber 192 is decreased, the pressing plate 187 is pressed to the pressed plate 188 by the hydraulic pressure in the hydraulic chamber 190 to be connected to the pressed plate 188 by friction to turn the lock-up clutch 185 to the ON state, and when the hydraulic pressure in the hydraulic chamber 192 is increased, the pressing plate 187 is not pressed to the pressed plate 188 by the hydraulic pressure in the hydraulic chamber 190 to be disconnected from the pressed plate 188 to turn the lock-up clutch 108 to the OFF state.

A cap 151 opposite to the front end of the crank shaft 19 is fastened to the second cover member 38 of a front cover 36 and a first partition plate 195 is fixed to the inside surface of the cap 151 to form a first hydraulic chamber 194 between the second cover member 38 and the cap 151 and a second partition plate 198 is fixed to the cap 151 to form a second oil chamber 196 separated from the first hydraulic chamber 194 between the first partition plate 195 and the second partition plate 198 and a third hydraulic chamber 197 between the cap 151 and second partition plate 198.

The front end portion of a first pipe 199 put into the crank shaft 19 is hermetically supported by the first partition plate 195 and a first oil passage 191 is formed annularly between the first pipe 199 and the crank shaft 19 such that it communicates with the first hydraulic chamber 194. The front end portion of a second pipe 200 put into the first pipe 199 and the crank shaft 19 is hermetically supported by the second partition plate 198 and a second oil passage 193 is formed annularly between the first pipe 199 and the crank shaft 19 and the second pipe 200 such that it communicates with the second hydraulic chamber 196. A third oil passage 201 for introducing oil used for lubricating a crank pin 35 and the like is formed in the second pipe 200 and the crank shaft 19 such that it communicates with a third hydraulic chamber 197.

The first and third oil chambers 191, 197 communicate with an oil supply source 156 including an oil pump and the like and a lock-up clutch control valve 202 is connected to the second oil chamber 196. The lock-up clutch control valve 202 is an electromagnetic valve capable of switching between the state where the second oil chamber 196, that is, the second oil passage 193 communicates with the oil supply source 156 and the state where the second oil chamber 196, that is, the second oil passage 193 communicates with the oil storage 158 formed in the bottom portion of the crank case 33, and the hydraulic pressure in the hydraulic chamber 192 of the lock-up clutch 185 is controlled by the lock-up clutch control valve 202 to switch between the ON state and the OFF state of the lock-up clutch 185.

A starting clutch 184 is mounted on one end portion, that is, the front end portion of the transmitting shaft 63 and is provided with a clutch center 203 rotating around the axis of the transmitting shaft 63, a plurality of first clutch plates 204 engaged with the outer peripheral portion of the clutch center 203 such that they can not rotate relatively to the clutch center 203, a plurality of second clutch plates overlapping the first clutch plates 204, a clutch drum 206 receiving the first and second clutch plates 204, 205 and engaged with the outer peripheral portion of the second clutch plates 205 such that the second clutch plates 205 can not rotate and rotating integrally with the transmitting shaft 63, and a piston 207 slidably fitted in the clutch drum 206 and capable of engaging the first clutch plates 204 with the second clutch plates 205 by friction.

The piston 207 contacts one of the second clutch plates 205 and is slidably fitted in the clutch drum 206 and a hydraulic chamber 208 is formed between the clutch drum 206 and the piston 207. A returning spring 209 is interposed between the clutch drum 206 and the piston 207 and the piston 207 is urged by the returning spring 209 to the side in which the volume of the hydraulic chamber 208 is decreased.

In the clutch center 203, a driven gear 160 engaged with a driving gear 159 fixed to the turbine shaft 129 of a torque converter 48 is connected to the end portion projecting from the clutch drum 206 via a shock absorbing spring 210.

An oil passage 211 formed in the transmitting shaft 63 communicates with the above-mentioned hydraulic chamber 208 and the oil passage 211, that is, the hydraulic pressure in the hydraulic chamber 208 is switched between high and low pressures by a starting clutch control valve (not shown).

The third preferred embodiment is different only in the constitution and the arrangement of the starting clutch 184 and the constitution of the lock-up clutch 185 from the first and second preferred embodiments described above and hence can produce almost the same effects as the first and second preferred embodiments except for the effect produced by the arrangement of the starting clutch 184, that is, except that the starting clutch 184, the torque converter 48 and the lock-up clutch 185 can not be compactly arranged in the third preferred embodiment.

Figure 10:
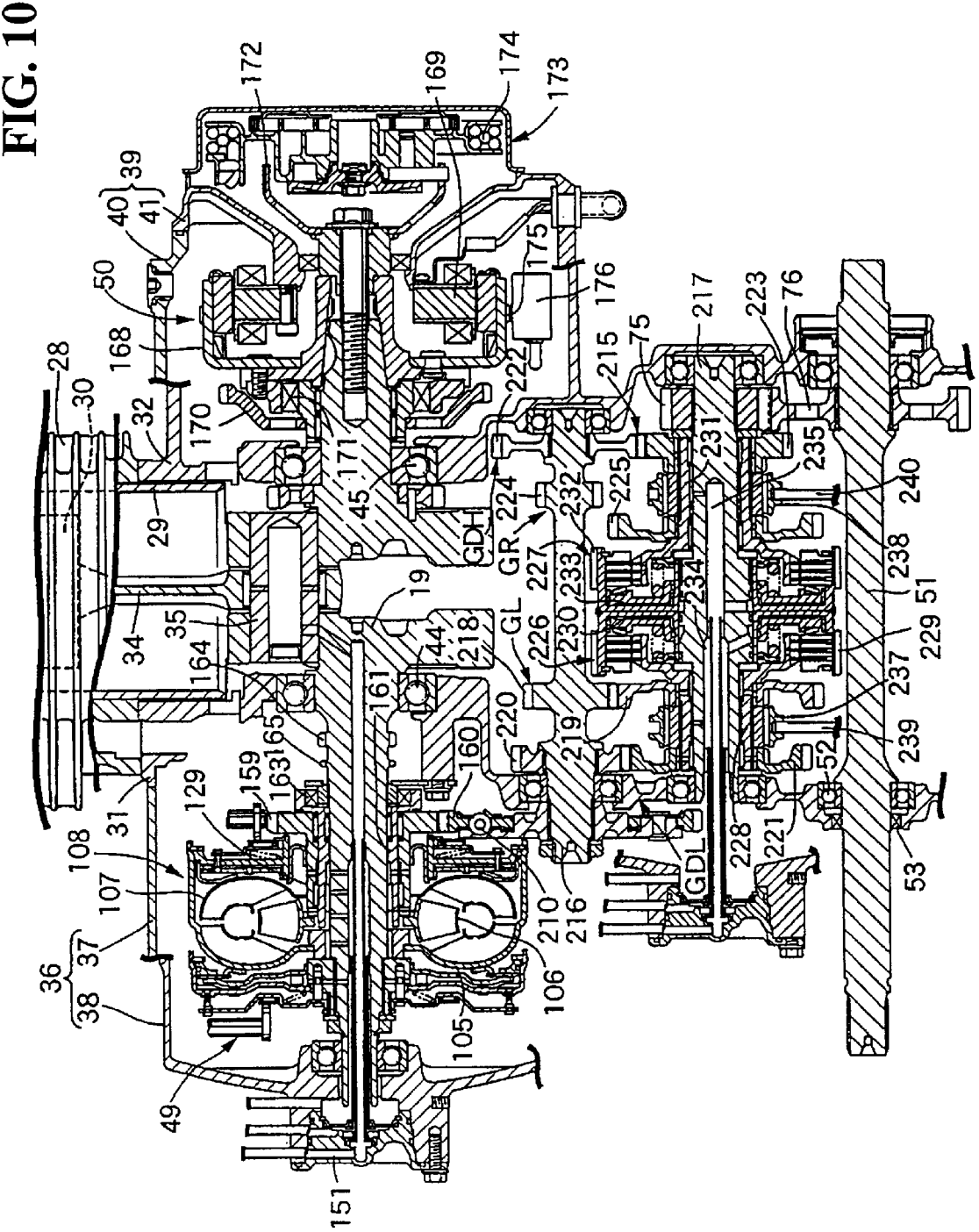
FIG. 10 is a vertical side view corresponding to FIG. 2 of the fourth preferred embodiment.

FIG. 10 shows the fourth preferred embodiment in accordance with the present invention, and the like reference characters are attached to the like parts corresponding to the parts in the preferred embodiments.

A power unit P3 is provided with an engine E, a gear transmission 215 capable of selectively establishing a plurality of speed change steps, a torque converter 48 capable of transmitting power from a crank shaft 19 to the gear transmission 215 and provided with a lock-up clutch 108, and a starting clutch 49 capable of transmitting power between the torque converter and the crank shaft 19 and interrupting the transmission of power, and a generator is coaxially connected to the crank shaft 19.

The gear transmission 215 is provided with a low gear train GL, a driving low gear train GDL, a driving high gear train GDH, and a reverse gear train GR, which can be selectively switched and established, an input shaft 216 and an output shaft 217 each of which has an axis parallel to the crank shaft 19, and a middle shaft not shown. The power outputted by the gear transmission 215 is transmitted to a transmitting shaft 51 having an axis parallel to the crank shaft 19.

The input shaft 216 and the output shaft 217 are rotatably supported by the crank case 33, and a driven gear 160 engaged with a driving gear 159 rotating integrally with the stator 107 of the torque converter 48 is mounted on the front end portion of the input shaft 216 projecting from the crank case 33 via a shock absorbing spring 210.

The low gear train GL is constituted of a driving gear 218 integrally formed with the input shaft 216 and a driven gear 219 relatively rotatably supported by the output shaft 217 and engaged with the driving gear 218. The driving low gear train GDL is constituted of a driving gear 220 fixed to the input shaft 216 and a driven gear 211 relatively rotatably supported by the output shaft 217 and engaged with the driving gear 220. The driving high gear train GDH includes a driving gear 222 fixed to the input shaft 216 and a driven gear 223 relatively rotatably supported by the output shaft 217 and engaged with the driving gear 222. The reverse gear train GR includes a driving gear 224 integrally formed with the input shaft 216, a driven gear 225 relatively rotatably supported by the output shaft 217, a first middle gear (not shown) engaged with the driving gear 224 and supported by a middle shaft, a second middle gear (not shown) integrally formed with the first middle gear and engaged with the driven gear 225.

A first switching clutch 226 and a second switching clutch 227 are mounted on the output shaft 217 between the driven gear 219 of the low gear train GL and the driven gear 225 of the reverse gear train GR.

The first switching clutch 226 is operatively positioned so that it can connect or disconnect a first clutch center 228 relatively rotatably supported by the output shaft 217 to or from a first clutch drum 229 integrally rotating with the output shaft 217 by controlling the hydraulic pressure in a first hydraulic chamber 230. Also the second switching clutch 227 is positioned so that it can connect or disconnect a second clutch center 231 relatively rotatably supported by the output shaft 217 to or from a second clutch drum 232 integrally rotating with the output shaft 217 by controlling the hydraulic pressure in a second hydraulic chamber 233.

Oil passages 234 and 235 which are made in the output shaft 217 independently of each other communicate with the hydraulic chambers 230, 233 of the first and second switching clutches 226, 227 and the hydraulic pressure is controlled independently in the hydraulic chambers 230, 233.

The driven gear 221 of the driving low gear train GDL and the driven gear 219 of the low gear train GL are spline-fitted at the fixed position of the first clutch center 228 of the first switching clutch 226 and a first dog clutch body 237 is spline-fitted on the first clutch center 228 between the driven gears 221 and 219 such that it can slide in the axial direction. When the first switching clutch 226 is in the ON state, if the first dog clutch body 237 is engaged with the driven gear 221, the driving low gear train GDL is established and if the first dog clutch body 237 is engaged with the driven gear 219, the low gear train GL is established.

The driven gear 225 of the reverse gear train GR and the driven gear 223 of the driving high gear train GDH are spline-fitted at the fixed position of the second clutch center 231 of the second switching clutch 227 and a second dog clutch body 238 is spline-fitted on the second clutch center 231 between the driven gears 225, 223 such that it can slide in the axial direction. When the second switching clutch 227 is in the ON state, if the second dog clutch body 238 is engaged with the driven gear 225, the reverse gear train GR is established and if the second dog clutch body 238 is engaged with the driven gear 223, the driving high gear train GDH is established.

According to this fourth preferred embodiment, since the gear transmission 215 is received in the crank case 33, it is not easy to maintain the gear transmission 215, but it is possible to automatically change speeds by performing the on-off control of the first and second switching clutches 226 and 227. That is, when a shift position is set at D to close a throttle, both the switching clutches 226, 227 are in the OFF state and power is not transmitted to a propelling shaft 51. When the throttle is opened, the first switching clutch 226 is turned to the ON state to establish the driving low gear train GDL to start an all-terrain saddle type vehicle. Next, as the vehicle speed increases and the opening of the throttle increases, the first switching clutch 226 is turned to the OFF state and the second switching clutch 227 is turned to the ON state to establish the driving high gear train GDH. In this way, the vehicle speed can be automatically changed.

As described above, according to the first aspect, it is possible to considerably reduce the number of speed change steps of the gear transmission, to simplify the constitution of the gear transmission, to improve durability, and to establish a maintenance-free all-terrain saddle type vehicle. Further, it is possible to keep a load in balance at both the ends of the crank shaft and to increase power transmitting rigidity from the crank shaft to the gear transmission by compactly arranging the torque converter, the lock-up clutch, and the driving gear outside the crank case at the position near to the crank case.

According to the second aspect, it is possible to compactly arrange the starting clutch capable of transmitting the power between the crank shaft and the torque converter or interrupting the transmission of the power according to the running condition of the all-terrain saddle type vehicle, the torque converter, and the lock-up clutch.

According to the third aspect, it is possible to reduce the size of the power transmitting unit in the direction along the axis of the crank shaft by effectively arranging the valve system driving cam chain having a narrow width along the axial direction of the crank shaft in a space between the driving gear and the crank case.

According to the fourth aspect, it is possible to mount or dismount the generator and the gear transmission in the state where they are removed from the crank case and hence to easily maintain the generator and the gear transmission.

Further, according to the fifth aspect, it is convenient for work often performed at constant speeds by the all-terrain saddle type vehicle such as planting seeds, dusting agricultural chemicals, or the like by putting the torque converter into the lock-up state immediately after the all-terrain saddle type vehicle starts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An all-terrain saddle type vehicle comprising:
   a gear transmission selectively operable for establishing a plurality of speed change steps;
   a transmitting unit for transmitting power from a crank shaft rotatably supported by a crank case of an engine to the gear transmission, said transmitting unit includes a torque converter having a pump rotated by the crank shaft; and
   a generator connected to the crank shaft;
   a cap positioned adjacent to one end of said crank shaft and a partition plate disposed within said cap for forming a first chamber and a second chamber; and
   a conduit positioned within said crank shaft and being hermetically supported by said partition plate, wherein:
      said first chamber is in communication with said torque converter and said second chamber is in communication with said conduit;
      said torque converter, a lock-up clutch mounted on the crank case side of the torque converter for directly connecting the pump to the turbine of the torque converter, and a driving gear rotating integrally with the turbine for transmitting the output of the torque converter to the gear transmission are mounted on one end side of the crank shaft outside the crank case wherein the lock-up clutch is sandwiched between the torque converter and the driving gear; and
      the generator is mounted on the other end side of the crank shaft outside the crank case.

2. The all-terrain saddle type vehicle according to claim 1, wherein a starting clutch for transmitting power between the pump of the torque converter and the crank shaft or interrupting the transmission of the power is arranged wherein the torque converter is sandwiched between the starting clutch and the lock-up clutch.

3. The all-terrain saddle type vehicle according to claim 1, wherein a valve system driving cam chain of a 4-cycle overhead cam type engine is interposed between the driving gear and the crank case.

4. The all-terrain saddle type vehicle according to claim 2, wherein a valve system driving cam chain of a 4-cycle overhead cam type engine is interposed between the driving gear and the crank case.

5. The all-terrain saddle type vehicle according to claim 1, wherein a cover is fixed to the crank case for forming an operation chamber between the cover and the crank case and wherein the generator and the gear transmission are both arranged adjacent to each other along the axial direction of the crank shaft and are received in the operation chamber.

6. The all-terrain saddle type vehicle according to claim 2, wherein a cover is fixed to the crank case for forming an operation chamber between the cover and the crank case and wherein the generator and the gear transmission are both arranged adjacent to each other along the axial direction of the crank shaft and are received in the operation chamber.

7. The all-terrain saddle type vehicle according to claim 3, wherein a cover is fixed to the crank case for forming an operation chamber between the cover and the crank case and wherein the generator and the gear transmission are both arranged adjacent to each other along the axial direction of the crank shaft and are received in the operation chamber.

8. The all-terrain saddle type vehicle according to claim 1, and further including a control unit for controlling the operation of the lock-up clutch wherein the lock-up clutch is turned to the ON state immediately after the all-terrain vehicle starts in the state where the lowest speed change step in the forward direction is established in the gear transmission.

9. The all-terrain saddle type vehicle according to claim 1, wherein said first chamber is further in communication with an oil pump and a starting clutch control valve, said starting clutch control valve selectively connects the first chamber with said oil pump and selectively connects the first chamber to an oil storage container.

10. An all-terrain saddle type vehicle comprising:
    a gear transmission selectively operable for establishing a plurality of speed change steps;
    a crank shaft operatively connected to said gear transmission, said crank shaft being rotatably supported by a crank case of an engine, said crank shaft having a first end and a distal end;
    a transmitting unit for transmitting power from the crank shaft to the gear transmission, said transmitting unit includes a torque converter having a pump rotated by the crank shaft; and
    a generator operatively connected to the crank shaft;
    a lock-up clutch mounted on the crank case side of the torque converter for directly connecting the pump to the turbine of the torque converter, said lock-up clutch being sandwiched between the torque converter and the driving gear;
    a driving gear rotating integrally with the turbine for transmitting the output of the torque converter to the gear transmission;
    a cap positioned adjacent to one end of said crank shaft and a partition plate disposed within said cap for forming a first chamber and a second chamber; and
    a conduit positioned within said crank shaft and being hermetically supported by said partition plate, wherein:
       said first chamber is in communication with said torque converter and said second chamber is in communication with said conduit;
       said torque converter, said lock-up clutch and said driving gear are mounted on the first end of the crank shaft outside the crank case; and
       the generator is mounted on the other end side of the crank shaft outside the crank case.

11. The all-terrain saddle type vehicle according to claim 10, wherein a starting clutch for transmitting power between the pump of the torque converter and the crank shaft or interrupting the transmission of the power is arranged wherein the torque converter is sandwiched between the starting clutch and the lock-up clutch.

12. The all-terrain saddle type vehicle according to claim 10, wherein a valve system driving cam chain of a 4-cycle overhead cam type engine is interposed between the driving gear and the crank case.

13. The all-terrain saddle type vehicle according to claim 10, wherein a cover is fixed to the crank case for forming an operation chamber between the cover and the crank case and wherein the generator and the gear transmission are both arranged adjacent to each other along the axial direction of the crank shaft and are received in the operation chamber.

14. The all-terrain saddle type vehicle according to claim 10, and further including a control unit for controlling the operation of the lock-up clutch wherein the lock-up clutch is turned to the ON state immediately after the all-terrain vehicle starts in the state where the lowest speed change step in the forward direction is established in the gear transmission.

15. The all-terrain saddle type vehicle according to claim 10, wherein said first chamber is further in communication with an oil pump and a starting clutch control valve, said starting clutch control valve selectively connects the first chamber with said oil pump and selectively connects the first chamber to an oil storage container.

16. The all-terrain saddle type vehicle according to claim 11, wherein a valve system driving cam chain of a 4-cycle overhead cam type engine is interposed between the driving gear and the crank case.

17. The all-terrain saddle type vehicle according to claim 11, wherein a cover is fixed to the crank case for forming an operation chamber between the cover and the crank case and wherein the generator and the gear transmission are both arranged adjacent to each other along the axial direction of the crank shaft and are received in the operation chamber.

18. The all-terrain saddle type vehicle according to claim 12, wherein a cover is fixed to the crank case for forming an operation chamber between the cover and the crank case and wherein the generator and the gear transmission are both arranged adjacent to each other along the axial direction of the crank shaft and are received in the operation chamber.

* * * * *